United States Patent
Ichimoto

(10) Patent No.: US 7,588,013 B2
(45) Date of Patent: Sep. 15, 2009

(54) ENGINE SYSTEM AND METHOD FOR CONTROLLING THE SAME

(75) Inventor: Kazuhiro Ichimoto, Nisihikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/158,006

(22) PCT Filed: Aug. 29, 2007

(86) PCT No.: PCT/IB2007/002487

§ 371 (c)(1),
(2), (4) Date: Jun. 18, 2008

(87) PCT Pub. No.: WO2008/026042

PCT Pub. Date: Mar. 6, 2008

(65) Prior Publication Data

US 2008/0302330 A1 Dec. 11, 2008

(30) Foreign Application Priority Data

Aug. 31, 2006 (JP) .............................. 2006-235688

(51) Int. Cl.
*F02D 13/00* (2006.01)
*G06F 19/00* (2006.01)
*G06G 7/70* (2006.01)

(52) U.S. Cl. ..................... 123/347; 701/110; 701/112

(58) Field of Classification Search ............ 123/90.15, 123/90.17, 179.4, 321, 347, 348, 403; 180/65.28; 477/200; 701/110, 112; 903/905
See application file for complete search history.

(56) References Cited

U.S. PATENT DOCUMENTS

| 4,574,752 | A  | * | 3/1986  | Reichert et al. | ....... 123/198 DB |
| 5,924,395 | A  | * | 7/1999  | Moriya et al.   | ............ 123/90.15 |
| 6,772,723 | B2 | * | 8/2004  | Aoki et al.     | ................ 123/179.4 |
| 6,820,578 | B2 | * | 11/2004 | Kanada et al.   | ............ 123/90.15 |
| 6,840,201 | B2 | * | 1/2005  | Miura           | ...................... 123/90.15 |
| 7,066,127 | B2 | * | 6/2006  | Flanagan et al. | ......... 123/179.4 |
| 7,110,877 | B2 | * | 9/2006  | Ozeki et al.    | ................. 701/112 |
| 7,322,323 | B2 | * | 1/2008  | Kawasaki et al. | ........ 123/90.15 |

(Continued)

FOREIGN PATENT DOCUMENTS

EP  0 859 130  8/1998

(Continued)

*Primary Examiner*—Stephen K Cronin
*Assistant Examiner*—David Hamaoui
(74) *Attorney, Agent, or Firm*—Oblon, Spivak, McClelland, Maier & Neustadt, L.L.P.

(57) ABSTRACT

When a command to stop an engine is issued, it is determined whether a current state is a speed reduction enabled state where an intake valve phase is brought into a phase region, in which speed reduction ratio is high, by the time the engine is stopped if an engine speed reduction control according to a predetermined speed reduction pattern is started at the present moment. If it is determined the current state is not the speed reduction enabled state, starting of the engine speed reduction control is not permitted, or the engine speed reduction control is restricted by reducing the deceleration, and then an intake valve phase control is executed. Thus, a required length of time before the engine is stopped is ensured, namely, a required length of period in which the intake valve phase is changed is ensured.

10 Claims, 14 Drawing Sheets

U.S. PATENT DOCUMENTS

| | | | |
|---|---|---|---|
| 7,469,667 B2 * | 12/2008 | Leone et al. | 123/90.15 |
| 2002/0165660 A1 * | 11/2002 | Boggs et al. | 701/112 |
| 2005/0066933 A1 | 3/2005 | Kaita et al. | |
| 2005/0229880 A1 * | 10/2005 | Hashizume | 123/90.15 |
| 2005/0255968 A1 * | 11/2005 | Sah et al. | 477/200 |
| 2006/0030997 A1 * | 2/2006 | Ozeki et al. | 701/112 |
| 2006/0229797 A1 * | 10/2006 | Sawada et al. | 701/114 |

FOREIGN PATENT DOCUMENTS

| | | |
|---|---|---|
| JP | 2004 156461 | 6/2004 |
| JP | 2005 48707 | 2/2005 |
| JP | 2005 98142 | 4/2005 |
| WO | 2006 085477 | 8/2006 |

* cited by examiner (WHEN ENGINE STOP COMMAND IS ISSUED)

ENGINE SYSTEM AND METHOD FOR CONTROLLING THE SAME

BACKGROUND OF THE INVENTION

1. Field of the Invention

The invention relates generally to an engine system and a method for controlling the same, and, more specifically, to an engine system provided with a variable valve timing system and a method for controlling the same.

2. Description of the Related Art

A variable valve timing (VVT) system that changes the phase (i.e., crank angle), at which an intake valve or an exhaust valve is opened/closed, based on the engine operating state has been used. Such variable valve timing system changes the phase of the intake valve or the exhaust valve by rotating a camshaft, which opens/closes the intake valve or the exhaust valve, relative to, for example, a sprocket. The camshaft is rotated hydraulically or by means of an actuator, for example, an electric motor.

With a variable valve timing system that hydraulically drives a camshaft, the variable valve timing control is sometimes not executed as accurately as it should be, in a cold environment or at the time of engine starting. Such inconvenience is caused because the hydraulic pressure used to drive the camshaft is insufficient or the response of the camshaft to the hydraulic control is slow in such occasions. To obviate such inconveniences, a variable valve timing system that drives a camshaft by means of an electric motor has been suggested, as described in, for example, Japanese Patent Application Publication No. JP-2005-98142 (JP-A-2005-98142), Japanese Patent Application Publication No. JP-2005-48707 (JP-A-2005-48707), and Japanese Patent Application Publication No. 2004-156461 (JP-A-2004-156461).

JP-A-2005-98142 and JP-A-2005-48707 each describe a variable valve timing system that changes the rotational phase of a camshaft relative to a crankshaft, namely, the valve timing in accordance with the rotational phase difference between a sprocket and a guide rotating body that is rotated by an electric motor. JP-A-2005-98142 describes a mechanism that changes the ratio of the amount of change in the rotational phase of a camshaft relative to a crankshaft (valve timing), with respect to the amount of change in the rotational phase of a guide rotating body relative to a sprocket depending on the phase region in which the phase of the valve timing is present. As shown in FIG. 16 in JP-A-2005-98142, the above-described change-amount ratio is relatively low in the phase region in which the valve timing is delayed, while the above-described change-amount ratio is relatively high in the phase region in which the valve timing is advanced.

With the configuration described in each of JP-A-2005-98142 and JP-A-2005-48707, the valve timing is changed by reducing the relative rotational speed between the output shaft of the electric motor that rotates the guide rotating body and the sprocket at the speed reduction ratio corresponding to the above-described change-amount ratio. Namely, with the configuration described in JP-A-2005-98142, the speed reduction ratio is variably set based on the phase region in which the phase of the valve timing is present.

Accordingly, in the phase region in which the speed reduction ratio is low, that is, the phase region in which the amount of change in the valve timing with respect to the relative rotational speed between the output shaft of the electric motor and the sprocket is large, the valve timing may be undesirably changed due to the rotation of the output shaft of the electric motor, which is caused by a reaction force applied to the camshaft, when the engine is stopped.

Especially, when the variable valve timing system described in JP-A-2005-98142 is mounted in a vehicle (for example, a hybrid vehicle) provided with a speed reduction control mechanism that reduces the engine speed in a predetermined speed reduction pattern by using, for example, a motor torque in order to dampen vibration of the vehicle when the engine is stopped, the configuration needs to be such that an undesirable change in the valve timing is not caused when the engine is stopped.

SUMMARY OF THE INVENTION

The invention provides an engine system which is provided with a speed reduction control mechanism that reduces an engine speed in a predetermined speed reduction pattern to stop an engine, and which prevents an undesirable change in the valve timing from occurring when the engine is stopped, and a method for controlling the same.

A first aspect of the invention relates to an engine system which includes an engine that produces drive power by burning fuel; a variable valve timing system that changes the opening/closing timing of at least one of an intake valve and an exhaust valve provided in the engine; and an engine speed reduction control unit. The engine speed reduction control unit applies a torque, used to reduce the engine speed in a predetermined speed reduction pattern, to an output shaft of the engine, when a command to stop the engine is issued. The variable valve timing system includes a changing mechanism. The changing mechanism changes the opening/closing timing by changing the rotational phase difference between a camshaft, which drives the valve of which the opening/closing timing is changed, and a crankshaft by a change amount corresponding to the operation amount of an actuator, when the engine is operating. The changing mechanism sets the ratio of the change amount of the opening/closing timing with respect to the operation amount of the actuator to a lower value when the opening/closing timing is within the first phase region than when the opening/closing timing is within the second phase region. The variable valve timing system further includes a determination unit and a speed reduction restriction unit. The determination unit determines whether the current state is the speed reduction enabled state in which it is possible to bring the opening/closing timing into the first phase region by the time the engine is stopped if reduction in the engine speed in the speed reduction pattern is started at the present moment that is after issuance of the command to stop the engine. The speed reduction restriction unit controls the operation of the engine speed reduction control unit after the command to stop the engine is issued based on the result of the determination made by the determination unit.

In the engine system described above, the operation of the engine speed reduction control unit is restricted, if it is determined that the current state is not the speed reduction enabled state where it is possible to bring the opening/closing timing (valve timing) into the first phase region, in which the ratio of the amount of change in the phase with respect to the operation amount of the actuator is low (i.e., the speed reduction ratio is high), by the time the engine is stopped. Thus, the valve timing is reliably changed by a required amount by the time the engine is stopped. Accordingly, the valve timing is reliably within the first phase region when the engine is stopped. As a result, an undesirable change in the valve timing is prevented from occurring when the engine is stopped.

In the first aspect of the invention, the speed reduction restriction unit may set the deceleration, at which the engine speed is reduced by the engine speed reduction control unit, to the first value according to the speed reduction pattern when it is determined that the current state is the speed reduction enabled state, while the speed reduction restriction unit may set the deceleration, at which the engine speed is reduced by the engine speed reduction control unit, to the second value that is lower than the first value when it is determined that the current state is not the speed reduction enabled state.

Thus, when the valve timing needs to be changed by the actuator by a large amount in order to bring the valve timing into the first phase region by the time the engine is stopped, a required length of time before the engine is stopped is ensured by reducing the deceleration at which the engine speed is reduced by the engine speed reduction control unit. In this way, the valve timing is reliably brought into the first phase region by the time the engine is stopped.

In the first aspect of the invention, the speed reduction restriction unit may refrain from giving permission to start the operation of the engine speed reduction control unit when it is determined that the current state is not the speed reduction enabled state, while the speed reduction restriction unit may permit starting of the operation of the engine speed reduction control unit when it is determined that the current state is the speed reduction enabled state.

Thus, when the valve timing needs to be changed by the actuator by a large amount in order to bring the valve timing into the first phase region by the time the engine is stopped, a required length of time before the engine is stopped is ensured by delaying starting of the operation of the engine speed reduction control unit. In this way, the valve timing is reliably brought into the first phase region by the time the engine is stopped.

In the first aspect of the invention, the determination unit may determine whether the current state is the speed reduction enabled state based on the phase difference by which the current opening/closing timing is apart from the first phase region.

The difference between the current valve timing and the valve timing within the first phase region is successively calculated even after the command to stop the engine is issued. Thus, it is possible to accurately determine whether it is necessary to restrict the operation performed by the engine speed reduction control unit to change the valve timing by a required amount.

In the first aspect of the invention, the determination unit may determine that the current state is not the speed reduction enabled state before the length of time that has elapsed since the command to stop the engine is issued reaches the reference time, while the determination unit may determine that the current state is the speed reduction enabled state after the length of time that has elapsed since the command to stop the engine is issued exceeds the reference time. The reference time may be set based on the phase difference by which the opening/closing timing when the command to stop the engine is issued is apart from the first phase region.

In this way, whether it is necessary to restrict the operation of the engine speed reduction control unit is easily determined without successively calculating the valve timing after the command to stop the engine is issued.

In the first aspect of the invention, the engine system may be mounted in a hybrid vehicle that includes the engine and another drive power source, and the engine speed reduction control unit may include a rotary electric device that has a rotating shaft connected to the output shaft of the engine via a gear.

Thus, an undesirable change in the valve timing is prevented from occurring when the engine is stopped, in the engine system that is mounted in the hybrid vehicle and that uses the rotary electric device (a motor generator) as the engine speed reduction control unit.

In the first aspect of the invention, the engine speed reduction control unit may include a rotary electric device that has a rotating shaft connected to the output shaft of the engine via a belt.

Thus, an undesirable change in the valve timing is prevented from occurring when the engine is stopped, in the engine system that uses the rotary electric device (a motor generator or an alternator) as the engine speed reduction control unit.

In the first aspect of the invention, the command to stop the engine may be issued in response to an operation performed by a driver. Thus, an undesirable change in the valve timing is prevented from occurring when the engine is stopped in response to the operation performed by the driver (typically, when the operation to turn off an ignition key is performed), in the engine system provided with the mechanism that promptly reduces the rotational speed of the crankshaft to stop the engine.

In the first aspect of the invention, the command to stop the engine may be automatically issued in response to an occurrence of a predetermined operating state, independently of an operation performed by the driver.

Thus, an undesirable change in the valve timing is prevented from occurring when the engine is automatically stopped, in the engine system that is provided with a mechanism which reduces the engine speed in a predetermined speed reduction pattern to stop the engine, and that is included in a hybrid vehicle in which the engine intermittent operation is automatically performed or a vehicle provided with an economy running system.

A second aspect of the invention relates to a method for controlling an engine system that includes an engine which produces drive power by burning fuel; and a variable valve timing system which includes an actuator and which changes the opening/closing timing of at least one of an intake valve and an exhaust valve provided in the engine. According to the method, a torque, used to reduce the engine speed in a predetermined speed reduction pattern, is applied to an output shaft of the engine, when a command to stop the engine is issued. The opening/closing timing is changed by changing the rotational phase difference between a camshaft, which drives the valve of which the opening/closing timing is changed, and a crankshaft by a change amount corresponding to the operation amount of the actuator, when the engine is operating. The ratio of the change amount of the opening/closing timing with respect to the operation amount of the actuator is set to a lower value when the opening/closing timing is within the first phase region than when the opening/closing timing is within the second phase region. Then, it is determined whether the current state is the speed reduction enabled state in which it is possible to bring the opening/closing timing into the first phase region by the time the engine is stopped if reduction in the engine speed in the speed reduction pattern is started at the present moment that is after issuance of the command to stop the engine. The operation to reduce the engine speed after the command to stop the engine is issued is controlled based on the result of the determination.

The embodiments of the invention provide the engine system which is provided with the speed reduction control mechanism that reduces the rotational speed of the crankshaft to stop the engine, and which prevents an undesirable change in the valve timing from occurring when the engine is stopped, and the method for controlling the same.

BRIEF DESCRIPTION OF THE DRAWINGS

The foregoing and further objects, features and advantages of the invention will become apparent from the following description of an embodiment with reference to the accompanying drawings, wherein the same or corresponding portions will be denoted by the same reference numerals and wherein.

DETAILED DESCRIPTION OF THE EMBODIMENTS

Figure 1:
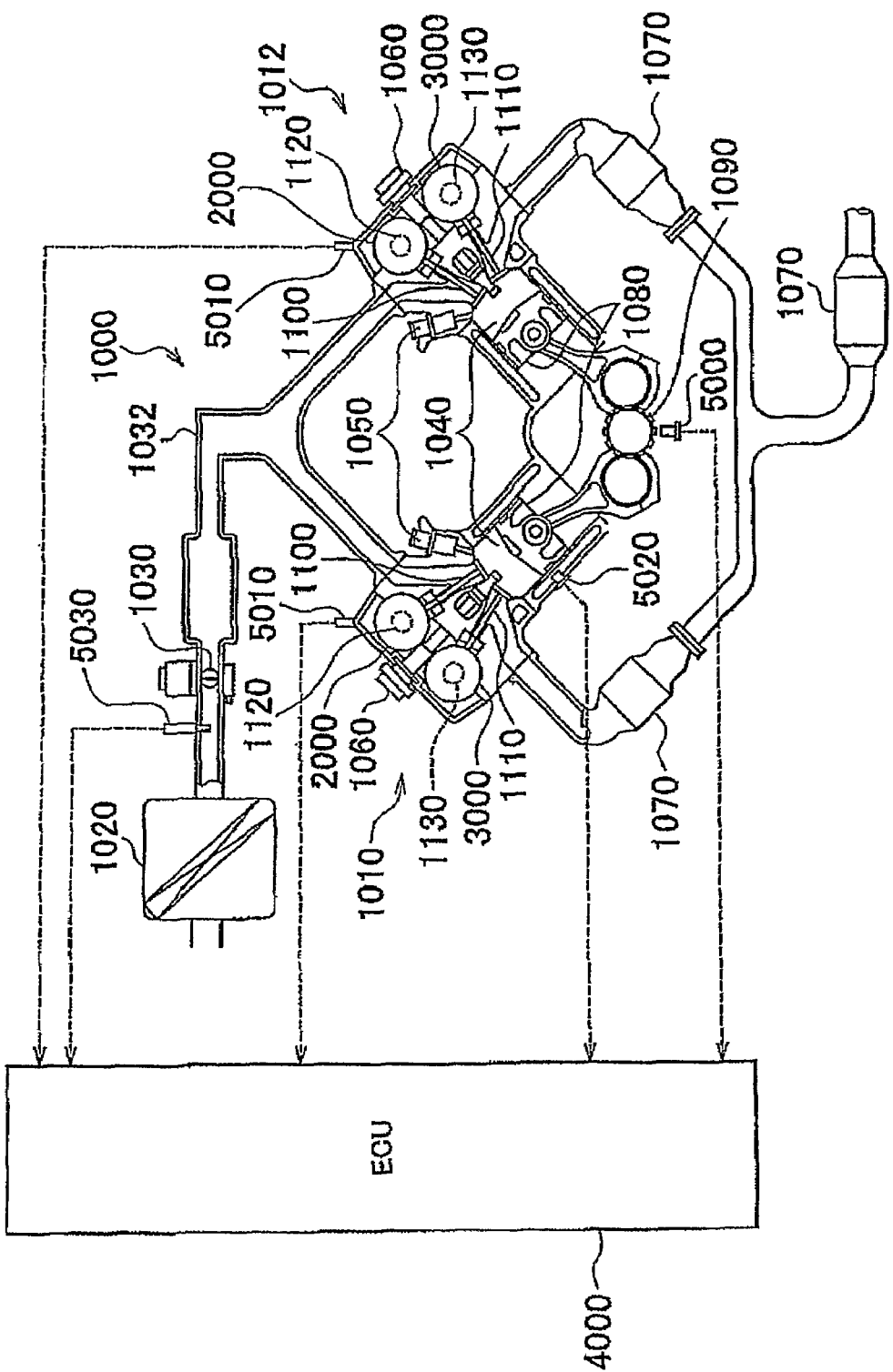
FIG. 1 is a view schematically showing the structure of a vehicle engine system provided with a variable valve timing system according to an embodiment of the invention.

Hereafter, an embodiment of the invention will be described with reference to the accompanying drawings. In the following description, the same or corresponding elements will be denoted by the same reference numerals. The names and functions of the elements having the same reference numerals are also the same. Accordingly, the descriptions concerning the elements having the same reference numerals will be provided only once below.

[Structure of Variable Valve Timing System and Control Over the Same]

First, the structure of a variable valve timing system according to the embodiment of the invention will be described.

First, a vehicle engine system provided with the variable valve timing system according to the embodiment of the invention will be described with reference to FIG. 1.

An engine 1000 an eight-cylinder V-type engine including a first bank 1010 and a second bank 1012 each of which has four cylinders therein. Note that, the variable valve timing system according to the embodiment of the invention may be applied to any types of engines. Namely, the variable valve timing system may be applied to engines other than an eight-cylinder V-type engine.

Air that has passed through an air cleaner 1020 is supplied to the engine 1000. A throttle valve 1030 adjusts the amount of air supplied to the engine 1000. The throttle valve 1030 is an electronically-controlled throttle valve that is driven by a motor.

The air is introduced into a cylinder 1040 through an intake passage 1032. The air is then mixed with fuel in a combustion chamber formed within the cylinder 1040. The fuel is injected from an injector 1050 directly into the cylinder 1040. Namely, the injection hole of the injector 1050 is positioned within the cylinder 1040.

The fuel is injected into the cylinder 1040 in the intake stroke. The time at which the fuel is injected need not be in the intake stroke. The description concerning the embodiment of the invention will be provided on the assumption that the engine 1000 is a direct-injection engine where the injection hole of the injector 1050 is positioned within the cylinder 1040. In addition to the injector 1050 for direct-injection, an injector for port-injection may be provided. Alternatively, only an injector for port-injection may be provided.

The air-fuel mixture in the cylinder 1040 is ignited by a spark plug 1060, and then burned. The burned air-fuel mixture, namely, the exhaust gas is purified by a three-way catalyst 1070, and then discharged to the outside of the vehicle. A piston 1080 is pushed down due to combustion of the air-fuel mixture, whereby a crankshaft 1090 is rotated.

An intake valve 1100 and an exhaust valve 1110 are provided on the top of the cylinder 1040. The intake valve 1100 is driven by an intake camshaft 1120, and the exhaust valve 1110 is driven by an exhaust camshaft 1130. The intake camshaft 1120 and the exhaust camshaft 1130 are connected to each other by, for example, a chain or a gear, and rotate at the same number of revolutions (at one-half the number of revolutions of the crankshaft 1090). Because the number of revolutions (typically, the number of revolutions per minute (rpm)) of a rotating body, for example, a shaft is usually referred to as the rotational speed, the term "rotational speed" will be used in the following description.

The phase (opening/closing timing) of the intake valve 1100 is controlled by an intake VVT mechanism 2000 which is fitted to the intake camshaft 1120. The phase (opening/closing timing) of the exhaust valve 1110 is controlled by an exhaust VVT mechanism 3000 which is fitted to the exhaust camshaft 1130.

In the embodiment of the invention, the intake camshaft 1120 and the exhaust camshaft 1130 are rotated by the VVT mechanisms 2000 and 3000, respectively, whereby the phase of the intake valve 1100 and the phase of the exhaust valve 1110 are controlled. However, the method for controlling the phase is not limited to this.

Figure 3:
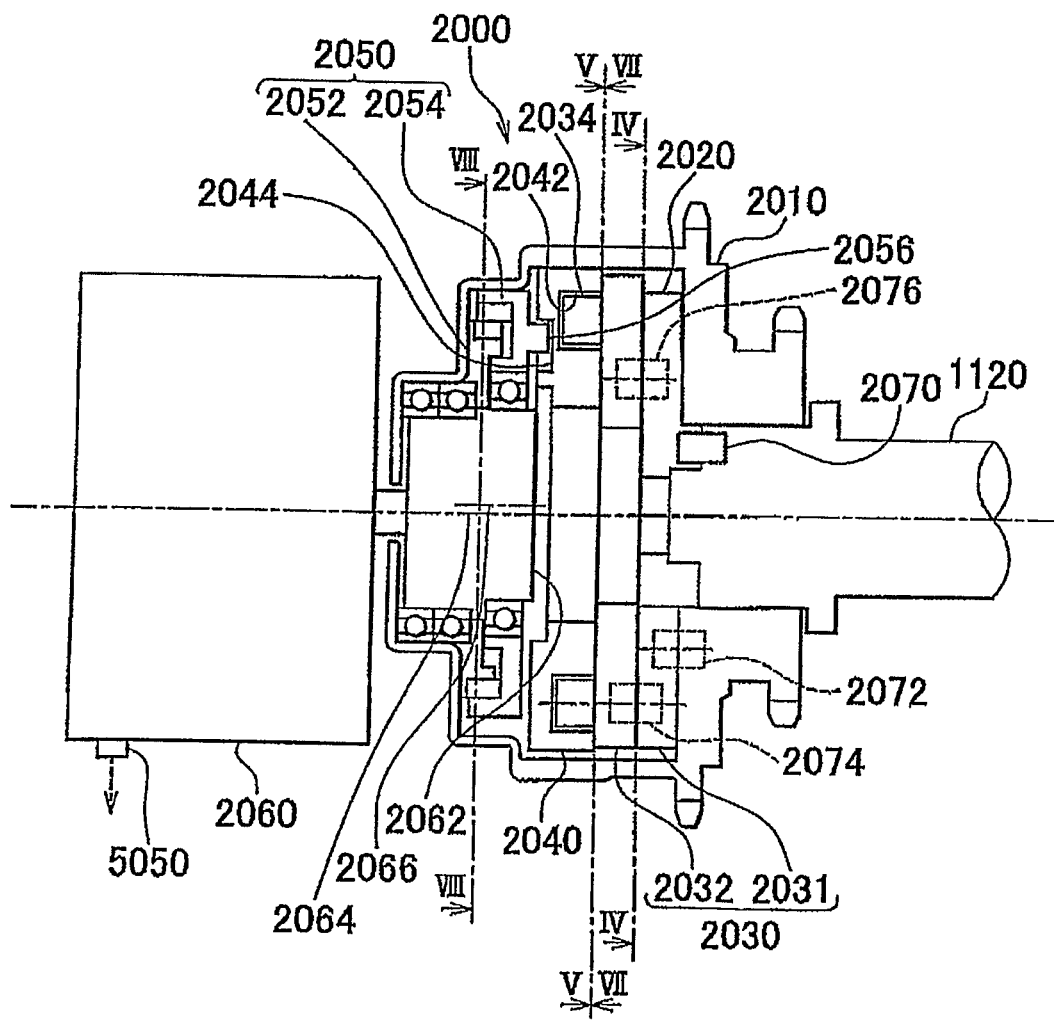
FIG. 3 is a cross-sectional view showing an intake VVT mechanism.

The intake VVT mechanism 2000 is operated by an electric motor 2060 (shown in FIG. 3). The electric motor 2060 is controlled by an electronic control unit (ECU) 4000. The magnitude of electric current passed through the electric motor 2060 is detected by an ammeter (not shown) and the voltage applied to the electric motor 2060 is detected by a voltmeter (not shown), and a signal indicating the magnitude of electric current and a signal indicating the voltage are transmitted to the ECU 4000.

The exhaust VVT mechanism 3000 is hydraulically operated. Note that, the intake VVT mechanism 2000 may be hydraulically operated. Note that, the exhaust VVT mechanism 3000 may be operated by means of an electric motor.

The ECU 4000 receives signals indicating the rotational speed and the crank angle of the crankshaft 1090, from a crank angle sensor 5000. The ECU 4000 also receives a signal indicating the phase of the intake camshaft 1120 and a signal indicating the phase of the exhaust camshaft 1130 (the positions of these camshafts in the rotational direction), from a camshaft position sensor 5010.

In addition, the ECU 4000 receives a signal indicating the temperature of a coolant for the engine 1000 (the coolant temperature) from a coolant temperature sensor 5020, and a signal, indicating the amount of air supplied to the engine 1000, from an airflow meter 5030.

The ECU 4000 controls the throttle valve opening amount, the ignition timing, the fuel injection timing, the fuel injection amount, the phase of the intake valve 1100, the phase of the exhaust valve 1110, etc. based on the signals received from the above-mentioned sensors and the maps and programs stored in memory (not shown) so that the engine 1000 is brought into the desired operating state.

According to the embodiment of the invention, the ECU 4000 successively sets the target phase of the intake valve 1100 appropriate for the current engine operating state with reference to the map that defines the target phase in advance using parameters indicating the current engine operating state, typically, using the engine speed NE and the intake air amount KL. Generally, multiple maps, used to set the target phase of the intake valve 1100 at multiple coolant temperatures, are stored.

Hereafter, the intake VVT mechanism 2000 will be described in more detail. Note that, the exhaust VVT mechanism 3000 may have the same structure as the intake VVT mechanism 2000 described below. Alternatively, each of the intake VVT mechanism 2000 and the exhaust VVT mechanism 3000 may have the same structure as the intake VVT mechanism 2000 described below.

As shown in FIG. 3, the intake VVT mechanism 2000 includes a sprocket 2010, a cam plate 2020, link mechanisms 2030, a guide plate 2040, a speed reducer 2050, and the electric motor 2060.

The sprocket 2010 is connected to the crankshaft 1090 via, for example, a chain. The rotational speed of the sprocket 2010 is one-half the rotational speed of the crankshaft 1090, as in the case of the intake camshaft 1120 and the exhaust camshaft 1130. The intake camshaft 1120 is provided such that the intake camshaft 1120 is coaxial with the sprocket 2010 and rotates relative to the sprocket 2010.

The cam plate 2020 is connected to the intake camshaft 1120 with a first pin 2070. In the sprocket 2010, the cam plate 2020 rotates together with the intake camshaft 1120. The cam plate 2020 and the intake camshaft 1120 may be formed integrally with each other.

Figure 4:
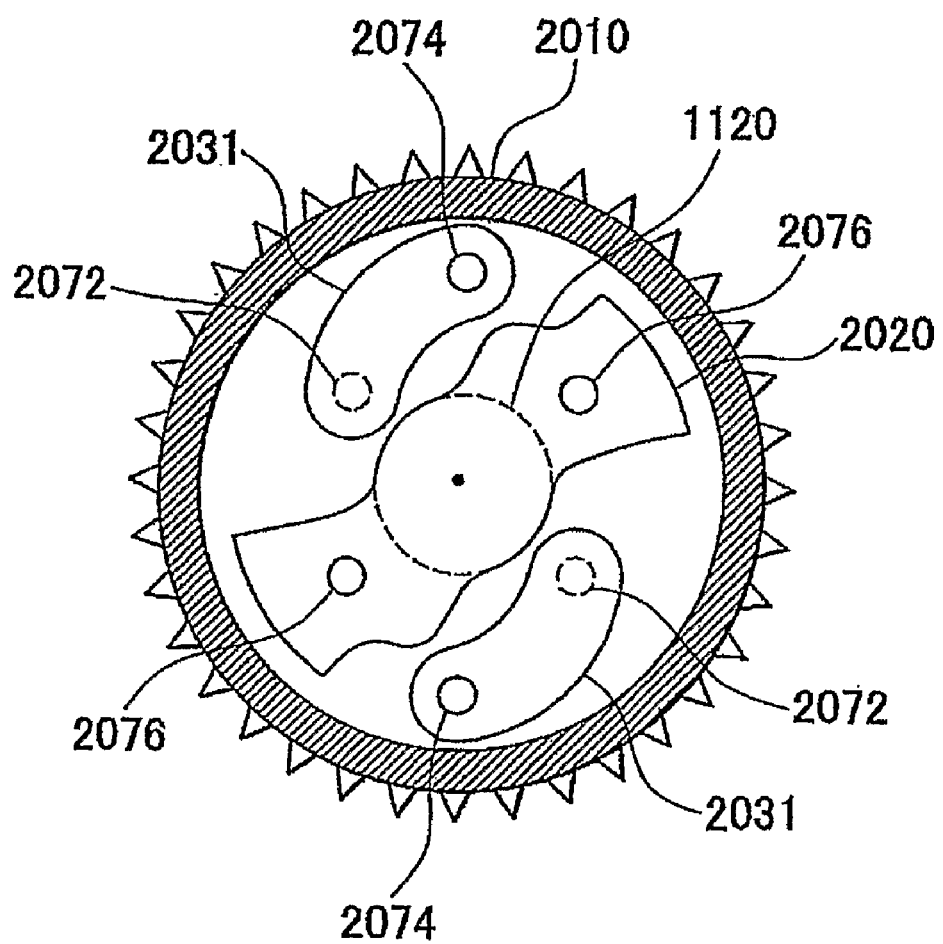
FIG. 4 is a cross-sectional view taken along the line IV-IV in FIG. 3.

Each link mechanism 2030 is formed of a first arm 2031 and a second arm 2032. As shown in FIG. 4, that is, a cross-sectional view taken along the line IV-IV in FIG. 3, paired first arms 2031 are arranged in the sprocket 2010 so as to be symmetric with respect to the axis of the intake camshaft 1120. Each first arm 2031 is connected to the sprocket 2010 so as to pivot about a second pin 2072.

Figure 5:
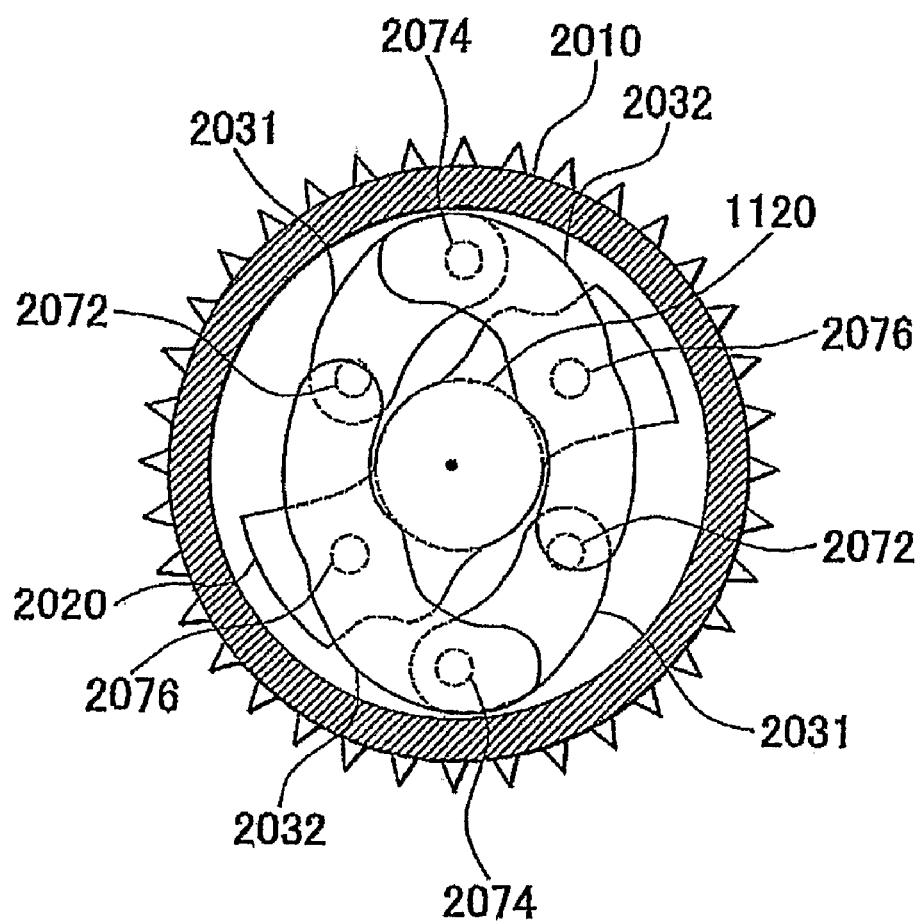
FIG. 5 is a first cross-sectional view taken along the line V-V in FIG. 3.
Figure 6:
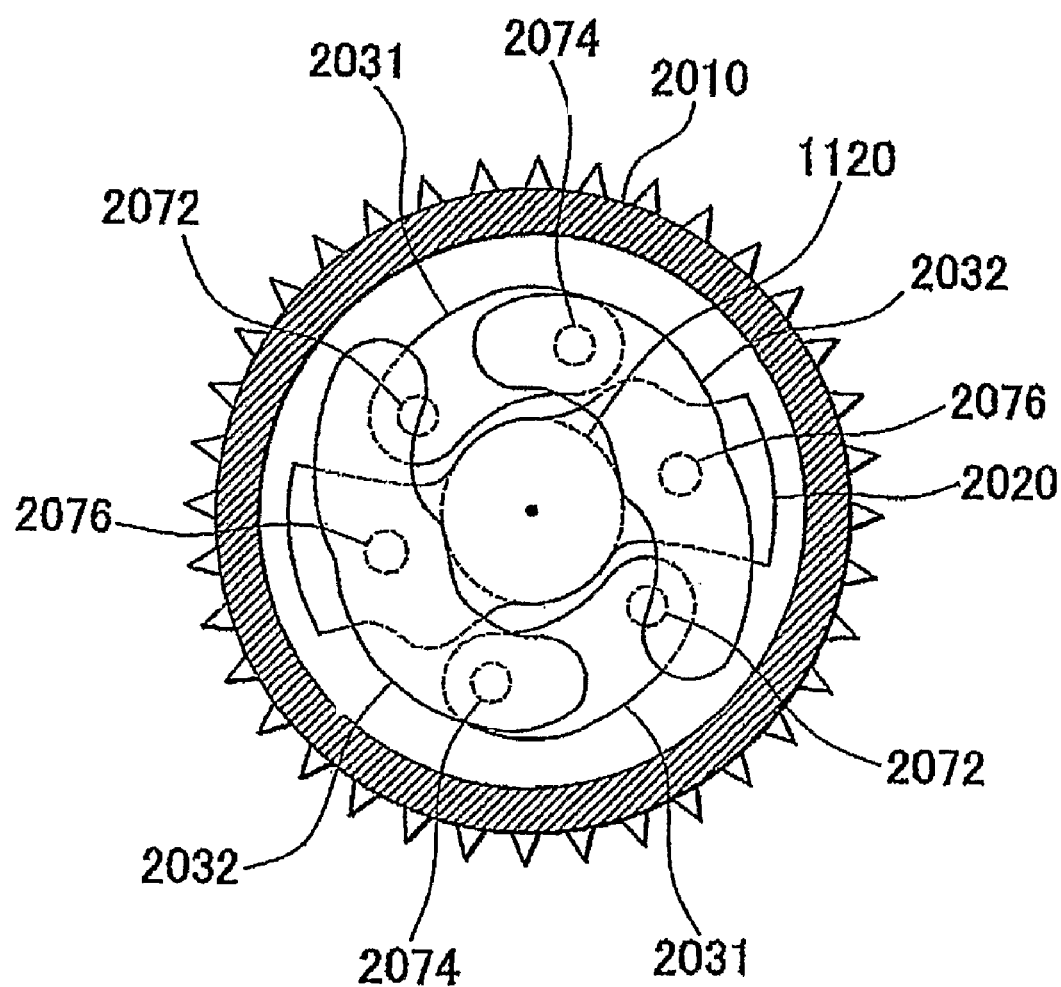
FIG. 6 is a second cross-sectional view taken along the line V-V in FIG. 3.

As shown in FIG. 5, that is, a cross-sectional view taken along the line V-V in FIG. 3, and FIG. 6 that shows the state achieved by advancing the phase of the intake valve 1100 from the state shown in FIG. 5, the first arms 2031 and the cam plate 2020 are connected to each other by the second arms 2032.

Each second arm 2032 is supported so as to pivot about a third pin 2074, with respect to the first arm 2031. Each second arm 2032 is supported so as to pivot about a fourth pin 2076, with respect to the cam plate 2020.

The intake camshaft 1120 is rotated relative to the sprocket 2010 by the pair of link mechanisms 2030, whereby the phase of the intake valve 100 is changed. Accordingly, even if one of the link mechanisms 2030 breaks and snaps, the phase of the intake valve 1100 is changed by the other link mechanism 2030.

As shown in FIG. 3, a control pin 2034 is fitted on one face of each link mechanism 2030 (more specifically, the second arm 2032), the face being proximal to the guide plate 2040. The control pin 2034 is arranged coaxially with the third pin 2074. Each control pin 2034 slides within a guide groove 2042 formed in the guide plate 2040.

Each control pin 2034 moves in the radial direction while sliding within the guide groove 2042 formed in the guide plate 2040. The movement of each control pin 2034 in the radial direction rotates the intake camshaft 1120 relative to the sprocket 2010.

Figure 7:
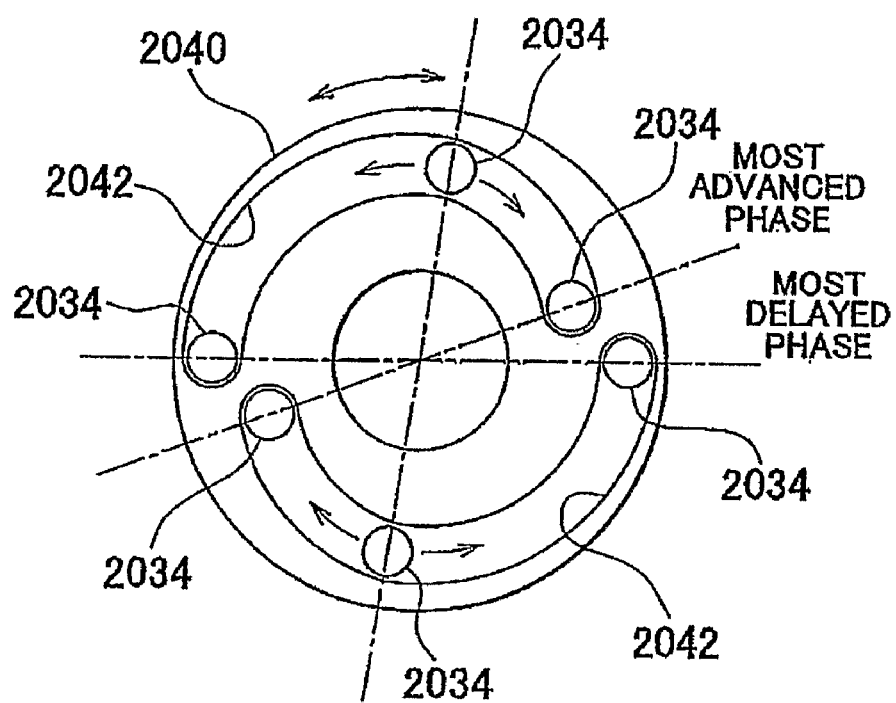
FIG. 7 is a cross-sectional view taken along the line VII-VII in FIG. 3.

As shown in FIG. 7, that is, a cross-sectional view taken along the line VII-VII in FIG. 3, the guide groove 2042 is formed in a spiral fashion such that the control pin 2034 moves in the radial direction in accordance with the rotation of the guide plate 2040. However, the shape of the guide groove 2042 is not limited to this.

As the distance between the control pin 2034 and the axis of the guide plate 2040 increases in the radial direction, the phase of the intake valve 1100 is more delayed. Namely, the amount of change in the phase corresponds to the amount by which each link mechanism 2030 is operated in accordance with the movement of the control pin 2034 in the radial direction. Note that, as the distance between the control pin 2034 and the axis of the guide plate 2040 increases in the radial direction, the phase of the intake valve 1100 may be more advanced.

As shown in FIG. 7, when the control pin 2034 reaches the end of the guide groove 2042, the operation of the link mechanism 2030 is restricted. Accordingly, the phase at which the control pin 2034 reaches the end of the guide groove 2042 is the most advanced phase or the most delayed phase of the intake valve 1100.

As shown in FIG. 3, multiple recesses 2044 are formed in one face of the guide plate 2040, the face being proximal to the speed reducer 2050. The recesses 2044 are used to connect the guide plate 2040 and the speed reducer 2050 to each other.

The speed reducer 2050 is formed of an externally-toothed gear 2052 and an internally-toothed gear 2054. The externally-toothed gear 2052 is fixed to the sprocket 2010 so as to rotate together with the sprocket 2010.

Multiple projections 2056, which are fitted in the recesses 2044 of the guide plate 2040, are formed on the internally-toothed gear 2054. The internally-toothed gear 2054 is supported so as to be rotatable about an eccentric axis 2066 of a coupling 2062 of which the axis deviates from an axis 2064 of the output shaft of the electric motor 2060.

Figure 8:
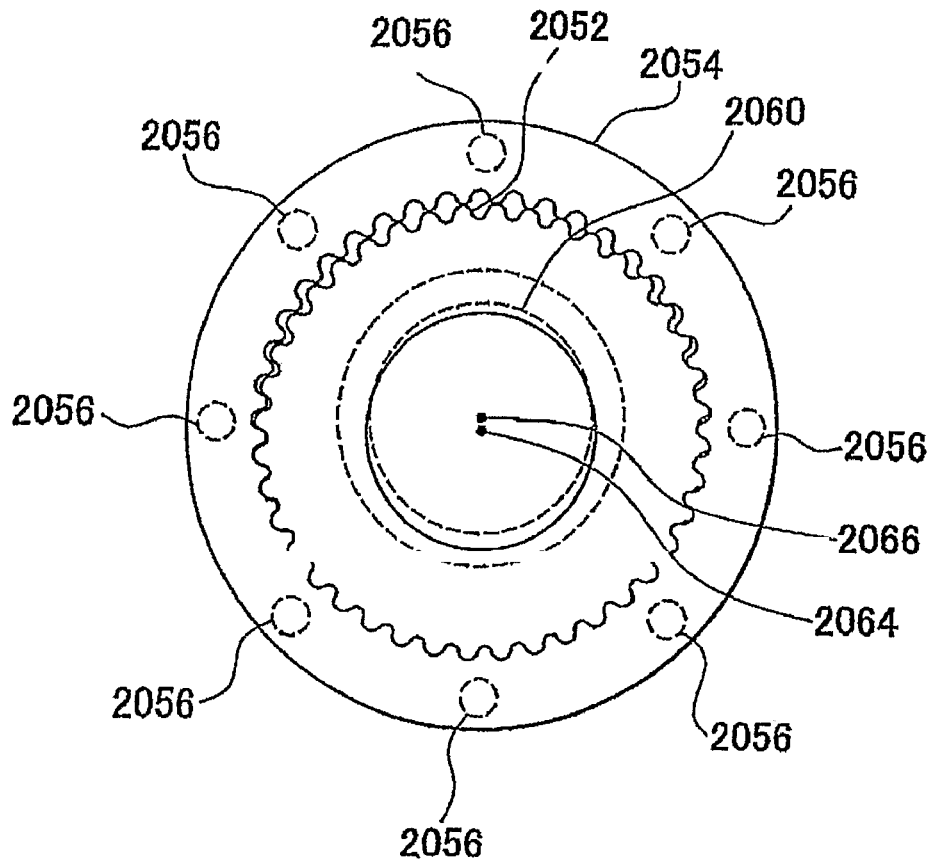
FIG. 8 is a cross-sectional view taken along the line VIII-VIII in FIG. 3.

FIG. 8 shows a cross-sectional view taken along the line VIII-VIII in FIG. 3. The internally-toothed gear 2054 is arranged such that part of the multiple teeth thereof mesh with the externally-toothed gear 2052. When the rotational speed of the output shaft of the electric motor 2060 is equal to the rotational speed of the sprocket 2010, the coupling 2062 and the internally-toothed gear 2054 rotate at the same rotational speed as the externally-toothed gear 2052 (the sprocket 2010). In this case, the guide plate 2040 rotates at the same rotational speed as the sprocket 2010, and the phase of the intake valve 1100 is maintained.

When the coupling 2062 is rotated about the axis 2064 relative to the externally-toothed gear 2052 by the electric motor 2060, the entirety of the internally-toothed gear 2054 turns around the axis 2064, and, at the same time, the internally-toothed gear 2054 rotates about the eccentric axis 2066. The rotational movement of the internally-toothed gear 2054 causes the guide plate 2040 to rotate relative to the sprocket 2010, whereby the phase of the intake valve 1100 is changed.

As can be seen from the structure described above, it is difficult to change the phase of the intake valve 1100 by solely rotating the internally-toothed gear 2054 using the electric motor 2060 when the engine 1000 is stopped, namely, when the rotation of the sprocket 2010 is stopped. That is, it is difficult for the intake VVT mechanism 2000 to change the valve timing after the engine 1000 is stopped.

The phase of the intake valve 1100 is changed by reducing the relative rotational speed (the operation amount of the electric motor 2060) between the output shaft of the electric motor 2060 and the sprocket 2010 using the speed reducer 2050, the guide plate 2040 and the link mechanisms 2030. Alternatively, the phase of the intake valve 1100 may be changed by increasing the relative rotational speed between the output shaft of the electric motor 2060 and the sprocket 2010. The output shaft of the electric motor 2060 is provided with a motor rotational angle sensor 5050 that outputs a signal indicating the rotational angle (the position of the output shaft in its rotational direction) of the output shaft. Generally, the motor rotational angle sensor 5050 produces a pulse signal each time the output shaft of the electric motor 2060 is rotated by a predetermined angle. The rotational speed of the output shaft of the electric motor 2060 (hereinafter, simply referred to as the "rotational speed of the electric motor 2060" where appropriate) is detected based on the signal output from the motor rotational angle sensor 5050.

Figure 9:
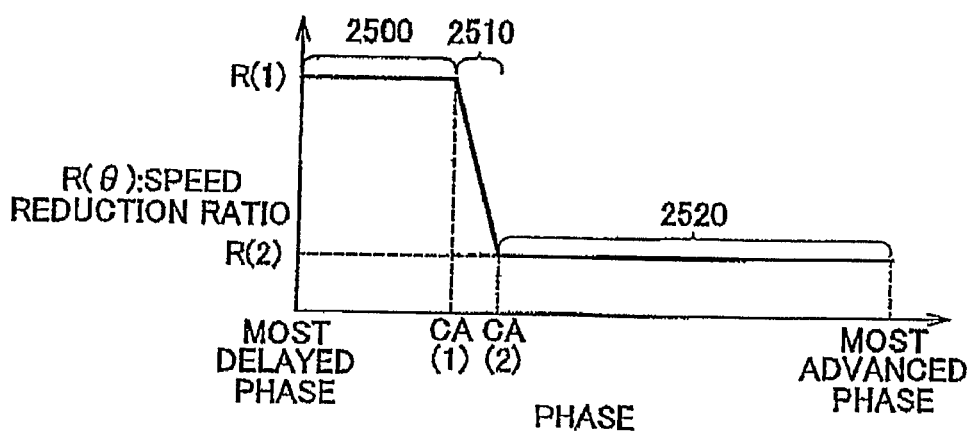
FIG. 9 is a graph showing the speed reduction ratio that the elements of the intake VVT mechanism realize in cooperation.

As shown in FIG. 9, the speed reduction ratio R ($\theta$) that the elements of the intake VVT mechanism 2000 realize in cooperation, namely, the ratio of the relative rotational speed between the output shaft of the electric motor 2060 and the sprocket 2010 to the amount of change in the phase of the intake valve 1100 may take a value corresponding to the phase of the intake valve 1100. According to the embodiment of the invention, as the speed reduction ratio increases, the amount of change in the phase with respect to the relative rotational speed between the output shaft of the electric motor 2060 and the sprocket 2010 decreases.

When the phase of the intake valve 1100 is within a phase region 2500 that extends from the most delayed phase to CA1, the speed reduction ratio that the elements of the intake VVT mechanism 2000 realize in cooperation is R1. When the phase of the intake valve 1100 is within a phase region 2520 that extends from CA2 (CA2 is the phase more advanced than CA1) to the most advanced phase, the speed reduction ratio that the elements of the intake VVT mechanism 2000 realize in cooperation is R2 (R1>R2).

When the phase of the intake valve 1100 is within a phase region 2510 that extends from CA1 to CA2, the speed reduction ratio that the elements of the intake VVT mechanism 2000 realize in cooperation changes at a predetermined rate ((R2−R1)/(CA2 −CA1)).

The effects of the thus configured intake VVT mechanism 2000 of the variable valve timing system according to the embodiment of the invention will be described below.

Figure 10:
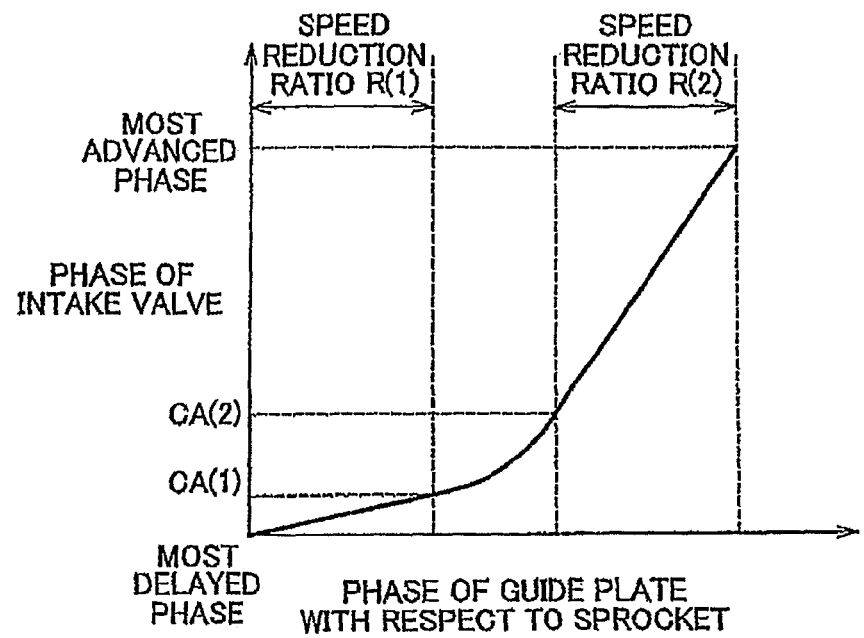
FIG. 10 is a graph showing the relationship between the phase of a guide plate relative to a sprocket and the phase of the intake camshaft.

When the phase of the intake valve 1100 (the intake camshaft 1120) is advanced, the electric motor 2060 is operated to rotate the guide plate 2040 relative to the sprocket 2010. As a result, the phase of the intake valve 1100 is advanced, as shown in FIG. 10.

When the phase of the intake valve 1100 is within the phase region 2500 that extends from the most delayed phase to CA1, the relative rotational speed between the output shaft of the electric motor 2060 and the sprocket 2010 is reduced at the speed reduction ratio R1. As a result, the phase of the intake valve 1100 is advanced.

When the phase of the intake valve 1100 is within the phase region 2520 that extends from CA2 to the most advanced phase, the relative rotational speed between the output shaft of the electric motor 2060 and the sprocket 2010 is reduced at the speed reduction ratio R2. As a result, the phase of the intake valve 1100 is advanced.

When the phase of the intake valve 1100 is delayed, the output shaft of the electric motor 2060 is rotated relative to the sprocket 2010 in the direction opposite to the direction in which the phase of the intake valve 1100 is advanced. When the phase is delayed, the relative rotational speed between the output shaft of the electric motor 2060 and the sprocket 2010 is reduced in the manner similar to that when the phase is advanced. When the phase of the intake valve 1100 is within the phase region 2500 that extends from the most delayed phase to CA1, the relative rotational speed between the output shaft of the electric motor 2060 and the sprocket 2010 is reduced at the speed reduction ratio R1. As a result, the phase is delayed. When the phase of the intake valve 1100 is within the phase region 2520 that extends from CA2 to the most advanced phase, the relative rotational speed between the output shaft of the electric motor 2060 and the sprocket 2010 is reduced at the speed reduction ratio R2. As a result, the phase is delayed.

Accordingly, as long as the direction of the relative rotation between the output shaft of the electric motor 2060 and the sprocket 2010 remains unchanged, the phase of the intake valve 1100 may be advanced or delayed in both the phase region 2500 that extends from the most delayed phase to CA1 and the phase region 2520 that extends from the CA2 to the most advanced phase. In this case, in the phase region 2520 that extends from CA2 to the most advanced phase, the phase is advanced or delayed by an amount greater than that in the phase region 2500 that extends from the most delayed phase to CA1. Accordingly, the phase region 2520 is broader in the phase change width than the phase region 2500.

In the phase region 2500 that extends from the most delayed phase to CA1, the speed reduction ratio is high. Accordingly, a high torque is required to rotate the output shaft of the electric motor 2060 using the torque applied to the intake camshaft 1120 in accordance with the operation of the engine 1000. Therefore, even when the electric motor 2060 does not generate a torque, for example, even when the electric motor 2060 is not operating, the rotation of the output shaft of the electric motor 2060, which is caused by the torque applied to the intake camshaft 1120, is restricted. This restricts occurrence of an undesirable phase change, that is, the deviation of the actual phase from the phase used in the control. Accordingly, if the phase of the intake valve 1100 is within the phase region 2500 when the engine 1000 is stopped, it is possible to prevent occurrence of an undesirable change in the phase of the intake valve 1100, that is, the deviation of the actual phase from the phase used in the control, even if the output shaft of the electric motor 2060 is rotated by the reaction force applied to the intake camshaft 1120 when the engine 1000 is stopped. Conversely, in order to prevent such a change in the phase of the intake valve 1100, the phase of the intake valve 1100 when the engine 1000 is stopped should be reliably within the phase region 2500 in which the speed reduction ratio is highest.

Preferably, the relationship between the direction in which the electric motor 2060 rotates relative to the sprocket 2010 and the advance/delay of the phase is set such that the phase of the intake valve 1100 is delayed when the output shaft of the electric motor 2060 is lower in rotational speed than the sprocket 2010. Thus, when the electric motor 2060 that serves as the actuator becomes inoperative while the engine is operating, the phase of the intake valve 1100 is gradually delayed, and finally agrees with the most delayed phase. Namely, even if the intake valve phase control becomes inexecutable, the phase of the intake valve 1100 is maintained at the phase at which combustion stably takes place in the engine 1000.

When the phase of the intake valve 1100 is within the phase region 2510 that extends from CA1 to CA2, the relative rotational speed between the output shaft of the electric motor 2060 and the sprocket 2010 is reduced at the speed reduction ratio that changes at a predetermined rate. As a result, the phase of the intake valve 1100 is advanced or delayed.

When the phase of the intake valve 1100 is shifted from the phase region 2500 to the phase region 2520, or from the phase region 2520 to the phase region 2500, the amount of change in the phase with respect to the relative rotational speed between the output shaft of the electric motor 2060 and the sprocket 2010 is gradually increased or reduced. Accordingly, an abrupt stepwise change in the amount of change in the phase is restricted to restrict an abrupt change in the phase. As a result, the phase of the intake valve 1100 is controlled more appropriately.

The speed reduction ratio $R(\theta)$ in FIG. 9 corresponds to the reciprocal of the ratio of the amount of change in the phase of the intake valve 1100 with respect to the operation amount of the electric motor 2060 (the relative rotational speed between the output shaft of the electric motor 2060 and the sprocket 2010). Namely, the phase region 2500 in which the speed reduction ratio is high may be regarded as a "first phase region" according to the invention, and the other phase regions 2510 and 2520 may be collectively regarded as a "second phase region" according to the invention.

Next, the intake valve phase control executed by the variable valve timing system according to the embodiment of the invention will be described in detail.

Figure 11:
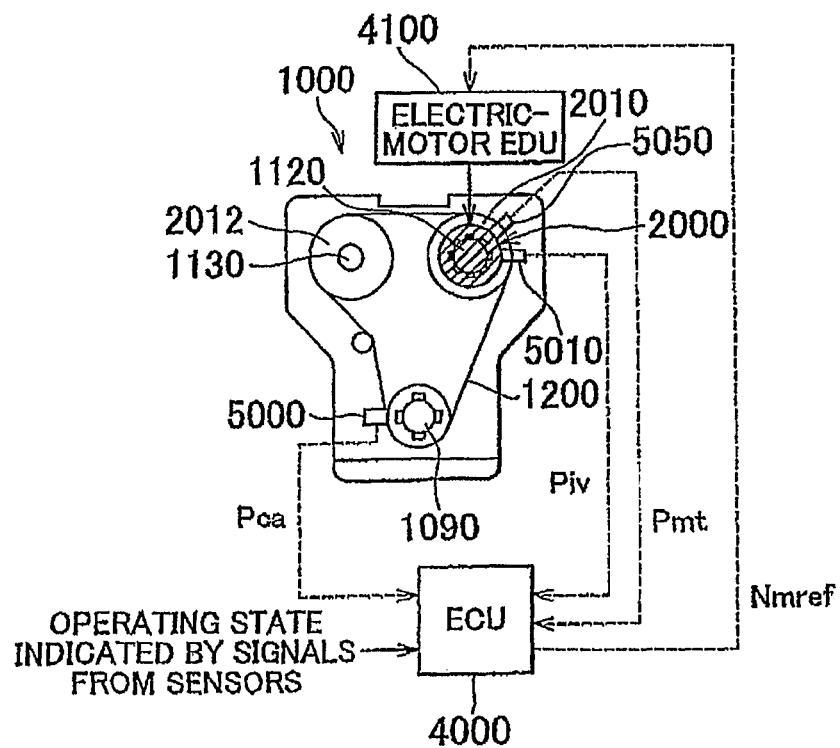
FIG. 11 is a schematic block diagram illustrating the configuration of the control over the phase of the intake valve, executed by the variable valve timing system according to the embodiment of the invention.

As shown in FIG. 11, the engine 1000 is configured such that the power is transferred from the crank shaft 1090 to the intake camshaft 1120 and the exhaust camshaft 1130 via the sprocket 2010 and a sprocket 2012, respectively, by a timing chain 1200 (or a timing belt), as previously described with reference to FIG. 1. The camshaft position sensor 5010 that outputs a cam angle signal Piv each time the intake camshaft 1120 rotates by a predetermined cam angle is fitted on the outer periphery of the intake camshaft 1120. The crank angle sensor 5000 that outputs a crank angle signal Pca each time the crankshaft 1090 rotates by a predetermined crank angle is fitted on the outer periphery of the crankshaft 1090. The motor rotational angle sensor 5050 that outputs a motor rotational angle signal Pmt each time the electric motor 2060 rotates by a predetermined rotational angle is fitted to a rotor (not shown) of the electric motor 2060. These cam angle signal Piv, crank angle signal Pca and motor rotational angle signal Pmt are transmitted to the ECU 4000.

Figure 2:
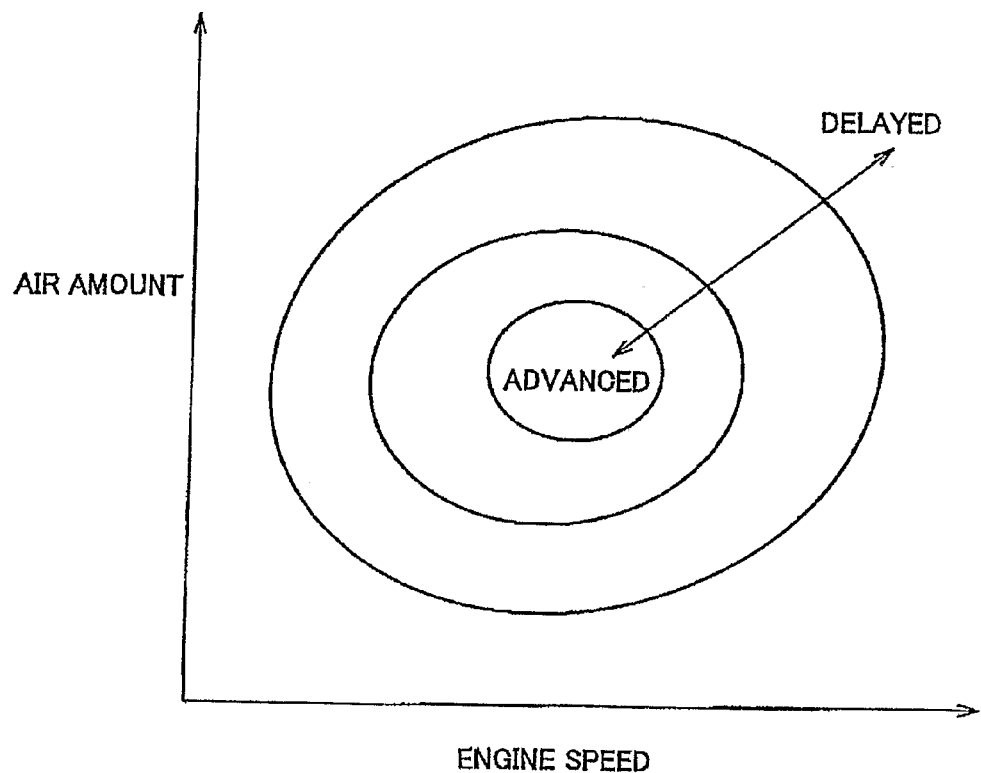
FIG. 2 is a graph showing the map that defines the phase of an intake camshaft.

The ECU 4000 controls the operation of the engine 1000 based on the signals output from the sensors that detect the operating state of the engine 1000 and the operation conditions (the pedal operations performed by the driver, the current vehicle speed, etc.) such that the engine 1000 generates a required output power. As part of the engine control, the ECU 4000 sets the target phase of the intake valve 1100 and the target phase of the exhaust valve 1110 based on the map shown in FIG. 2. In addition, the ECU 4000 prepares the rotational speed command value Nmref for the electric motor 2060 that serves as the actuator for the intake VVT mechanism 2000 such that the actual phase of the intake valve 1100 matches the target phase.

The rotational speed command value Nmref is set based on the relative rotational speed between the output shaft of the electric motor 2060 and the sprocket 2010 (the intake camshaft 1120), which corresponds to the operation amount of the actuator, as described in detail below. An electric-motor EDU (Electronic Drive Unit) 4100 controls the rotational speed of the electric motor 2060 based on the rotational speed command value Nmref indicated by a signal from the ECU 4000.

When the engine 1000 is going to stop, more specifically, after a command to stop the engine 1000 is issued, the target value of the phase (target phase) of the intake valve 1100 (hereinafter, referred to as the "intake valve phase" where appropriate) is set to the stop-time phase that is suitable for the engine starting in order to facilitate the subsequent engine starting. Namely, if it is determined that the intake valve phase differs from the stop-time phase (i.e., if the stop-time phase has not been achieved) when a command to stop the engine 1000 is issued, the variable valve timing system thereafter changes the intake valve phase (i.e., the phase of the intake camshaft 1120) by operating the electric motor 2060 that serves as the actuator. As described above, the stop-time phase is set within the phase region 2500, shown in FIG. 9, in which the speed reduction ratio is high, in order to prevent the intake valve phase from changing when the engine 1000 is stopped.

[Mounting of Engine System in Hybrid Vehicle]

Hereafter, a description will be provided on an example in which the engine system provided with the variable valve timing system according to the embodiment of the invention shown in FIGS. 1 to 11 is mounted in a hybrid vehicle.

Figure 12:
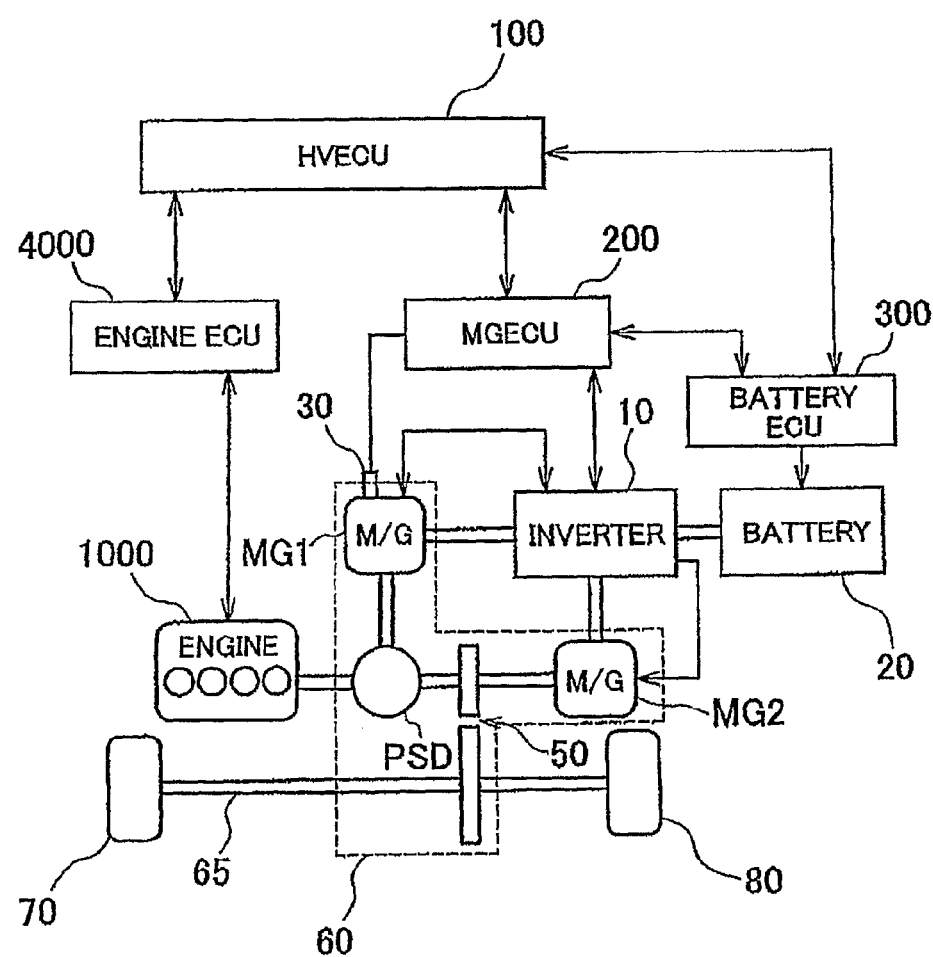
FIG. 12 is a schematic block diagram showing a power output apparatus for a hybrid vehicle that includes the engine system provided with the variable valve timing system according to the embodiment of the invention.

FIG. 12 is a schematic block diagram showing a power output apparatus for a hybrid vehicle that includes the engine system provided with the variable valve timing system according to the embodiment of the invention. The invention may be applied not only to the hybrid vehicle shown in FIG. 12 but also to any types of hybrid vehicles.

As shown in FIG. 12, the power output apparatus includes the engine 1000 shown in FIG. 1, the engine ECU 4000, a battery 20, an inverter 10, wheels 70 and 80, a transaxle 60, a MG ECU 200, a battery ECU 400, and a HV ECU 100.

The battery 20 supplies electric power directly to the inverter 10. The battery 20 is formed of an electrifiable secondary battery. Typically, a nickel hydride storage battery, a lithium ion secondary battery, or a large-capacity condenser (capacitor) is employed as the battery 20.

The inverter 10 converts the direct-current power supplied from the battery 20 into the alternating-current power, and supplies the alternating-current power to a motor generator MG2. Alternatively, the inverter 10 converts the alternating-current power supplied from a motor generator MG1 and the motor generator MG2 into the direct-current power, and supplies the direct-current power to the battery 20. A first inverter that is used to drive the motor generator MG1 and a second inverter that is used to drive the motor generator MG2 are collectively referred to as the inverter 10.

The transaxle 60 includes a transmission and an axle as an integral structure. The transaxle 60 includes a power split mechanism PSD, a reducer 50, the motor generator MG1 and the motor generator MG2.

Figure 13:
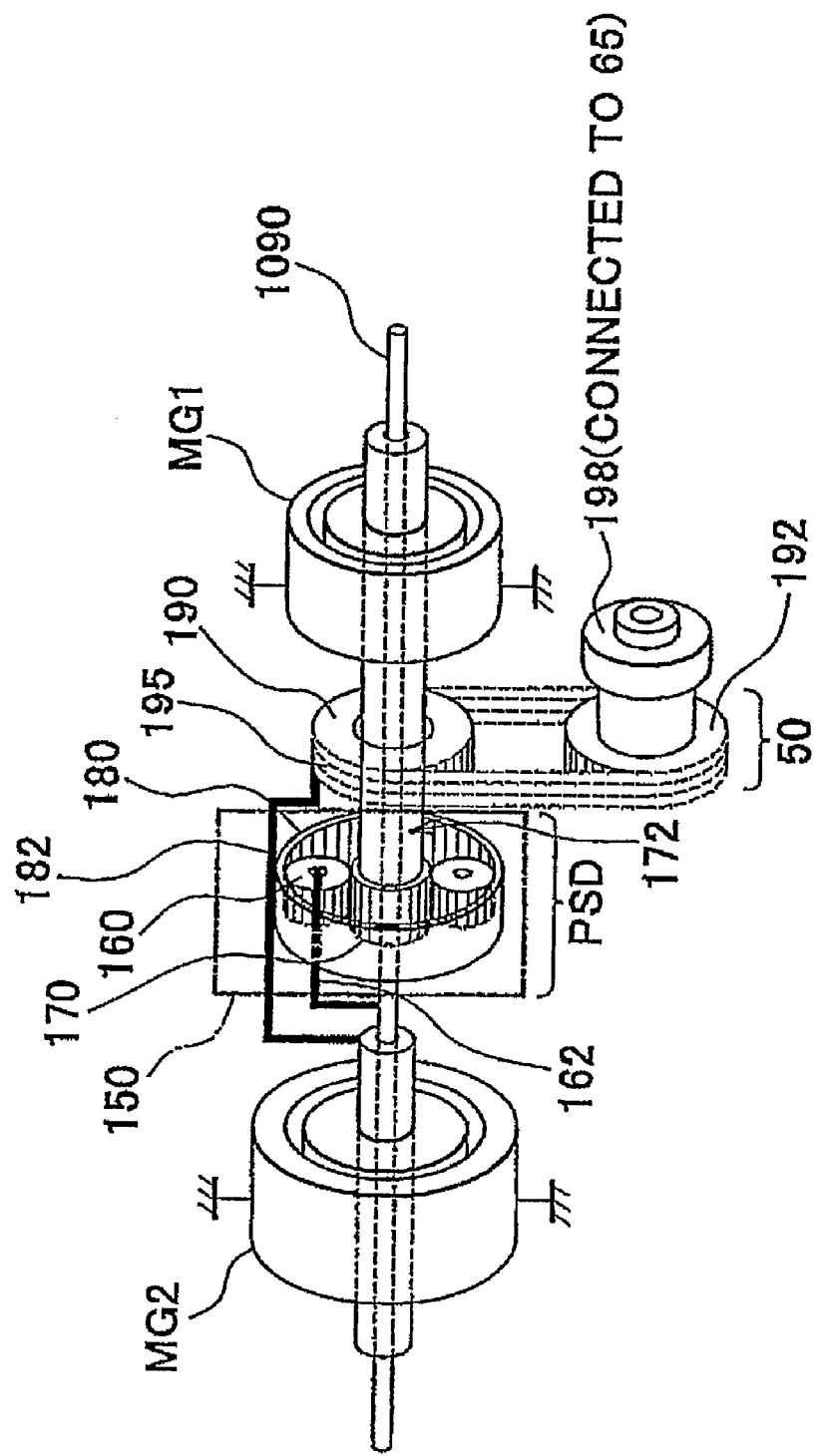
FIG. 13 is a view illustrating the configuration of a power split device formed of a planetary gear mechanism.

The power split mechanism PSD may be divided into a path through which the drive power generated by the engine 1000 is transferred to a drive shaft 65 connected to the wheels 70 and 80 via the reducer 50, and a path through which the drive power generated by the engine 1000 is transferred to the motor generator MG1. For example, a planetary gear mechanism shown in FIG. 13 is used as the power split mechanism PSD.

Each of the motor generator MG1 and the motor generator MG2 serves as both an electric power generator and an electric motor. The motor generator MG1 rotates using the drive power from the engine 1000 transferred via the power split mechanism PSD, thereby generating electric power. The electric power generated by the motor generator MG1 is supplied to the inverter 10, and used to charge the battery 20 or drive the motor generator MG2. A rotational speed sensor 30 detects the motor speed MRN1 of the motor generator MG1, and transmits a signal indicating the motor speed MRN1 to the MG ECU 200.

The motor generator MG2 rotates using the alternating-current power supplied from the inverter 10. The drive power generated by the motor generator MG2 is transferred to the drive shaft 65 via the reducer 50. Wheels (not shown) other than the wheels 70 and 80 that are driven by the drive shaft 65 may be driven wheels. Alternatively, the wheels other than the wheels 70 and 80 may be driven by another motor generator (not shown), and a so-called electric four-wheel drive system may be formed.

When the motor generator MG2 is rotated in accordance with a reduction in the rotational speed of the wheels 70 and 80 during the regenerative braking operation, the electromotive force (alternating-current power) generated in the motor generator MG2 is supplied to the inverter 10. In this case, the inverter 10 converts the received alternating-current power into the direct-current power and supplies the direct-current power to the battery 20, whereby the battery 20 is charged.

The engine ECU 4000 controls the operating state of the engine 1000. The battery ECU 400 controls the state of charge of the battery 20. The MG ECU 200 controls the motor generators MG1 and MG2, the inverter 10, the battery ECU 400, etc. based on the state of the hybrid vehicle. The HV ECU 100 communicates with the battery ECU 400, the engine ECU 4000, the MG ECU 200, etc. to control these ECUs, thereby controlling the entirety of a hybrid system such that the hybrid vehicle is operated at optimum efficiency.

Next, the manner in which the drive power is mechanically split by a planetary gear in the power split mechanism PSD will be described.

As shown in FIG. 13, the planetary gear mechanism 150 that forms the power split mechanism PSD includes a plurality of pinions 160, a sun gear 170, and a ring gear 180. The sun gear 170 and the ring gear 180 are arranged on the same rotational axis.

A sun gear shaft 172 which receives and then outputs the turning force of the sun gear 170 is connected to the rotating shaft (i.e., the rotor) of the motor generator MG1. A ring gear shaft 182 which receives and then outputs the turning force of the ring gear 182 is connected to the rotating shaft (i.e., the rotor) of the motor generator MG2.

The ring gear shaft 182 is connected also to a chain drive sprocket 190 that forms the reducer 50. The chain drive sprocket 190 is connected to a chain driven sprocket 192 via a chain 195. The chain driven sprocket 192 is connected to a counter drive gear 198 that is connected to the drive shaft 65. Thus, the rotational speed of the ring gear 180 is reduced by the reducer 50 at a predetermined speed reduction ratio, and the rotation having a reduced speed is transferred to the drive shaft 65.

The pinions 60 are arranged between the sun gear 170 and the ring gear 180, and each pinion 160 turns around the sun gear 170 while rotating about its axis. The turning force of each pinion 160 is supplied via a planetary carrier shaft 162, and used to rotate a planetary carrier 165. The planetary carrier shaft 162 is connected to the crankshaft 1090 that serves as the output shaft of the engine 1000.

In the planetary gear mechanism 150, if the rotational speeds of any two of the three shafts, namely, the sun gear shaft 172, the ring gear shaft 182 and the planetary carrier shaft 162, and the torques, which are received by and then output from these two shafts, are set, the rotational speed of the remaining shaft and the torque which is received by and then output from the remaining shaft are set.

When the hybrid vehicle including the power output apparatus is running, the power corresponding to the required power that should be output to the drive shaft 65 is output from the engine 1000, and the power output from the engine 1000 is transferred to the drive shaft 65 via the power split mechanism PSD. At this time, for example, when the output shaft of the engine 1000 (the crankshaft 1190) is rotating at a higher speed and a lower torque than the required rotational speed and the required torque that should be output from the drive shaft 65, part of the power output from the engine 1000 is transferred to the motor generator MG1 via the power split mechanism PSD. The motor generator MG1 generates electric power using the received power, and the motor generator MG2 is driven by the electric power generated by the motor generator MG1. A torque is applied to the drive shaft 65 via the ring gear 180 by driving the motor generator MG2.

On the other hand, when the output shaft of the engine 1000 (the crankshaft 1190) is rotating at a lower speed and a higher torque than the required rotational speed and the required torque that should be output from the drive shaft 65, part of the power output from the engine 1000 is transferred to the motor generator MG2 via the power split mechanism PSD, and the electric power is collected by the motor generator MG2. The motor generator MG1 is driven by the recovered electric power, and a torque is applied to the sun gear 170.

As described above, adjusting the power exchanged via the motor generator MG1 and the motor generator MG2 in the form of electric power makes it possible to output the drive power, produced by the engine 1000, from the drive shaft 65 that is rotated at desired rotational speed and torque. Part of the electric power collected by the motor generator MG1 and the motor generator MG2 may be stored in the battery. Also, the motor generator MG1 or the motor generator MG2 may be driven by the electric power stored in the battery.

Based on the principle of the operation described above, when the hybrid vehicle is running normally, the engine 1000 is used as the main drive power source and the motor generator MG2 is used as the sub-drive power source. The hybrid vehicle runs using both the engine 1000 and the motor generator MG2 as the drive power sources. In this way, the engine 1000 is operated at an operating point, at which the operation efficiency is high, based on the required torque and the torque that can be generated by the motor generator MG2. Accordingly, the hybrid vehicle excels in resource saving property and exhaust gas purification property, as compared with a vehicle that uses only the engine 1000 as a drive power source.

The rotation of the output shaft of the engine 1000 (the crankshaft 1190) is transferred to the motor generator MG1 via the power split mechanism PSD. Accordingly, the hybrid vehicle is able to run while electric power is generated by the motor generator MG1 in accordance with the operation of the engine 1000.

In the hybrid vehicle shown in FIGS. 12 and 13, the engine 1000 is going to stop the engine speed is controlled using the torque from the motor generator MG1, even after the fuel supply to the engine 1000 is stopped. Therefore, in the hybrid vehicle, the engine speed reduction control as shown in FIG. 14 is executed to dampen the vibration when the engine is going to stop.

Figure 14:
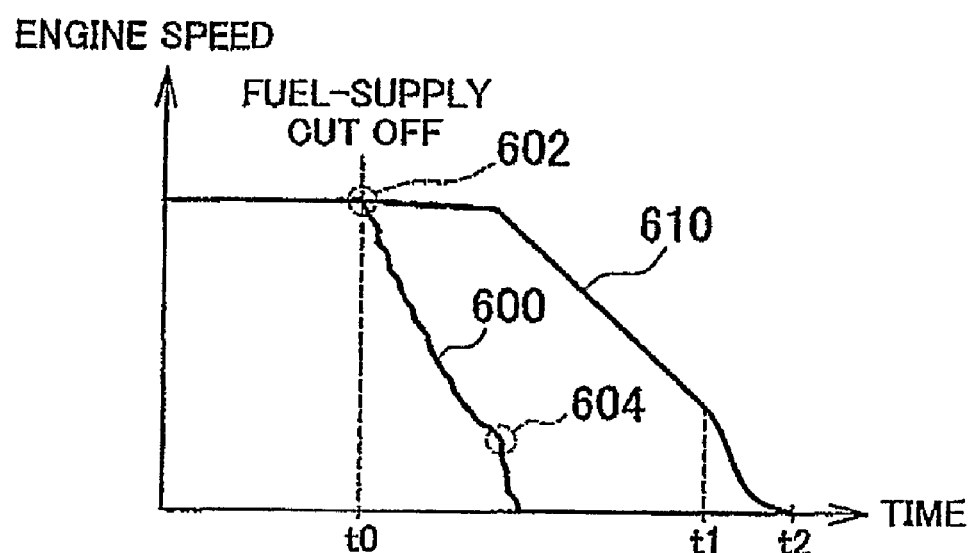
FIG. 14 is a graph illustrating the engine speed reduction control in the hybrid vehicle shown in FIGS. 12 and 13.

As shown in FIG. 14, when the torque from the motor generator MG1 is not used, the engine speed is abruptly reduced after the fuel supply is cut off at time t0, as shown by the line indicated by a reference numeral 600. At this time, vibration in the longitudinal direction of the vehicle is created due to an abrupt reduction in the drive power, in a region 602. In a region 604, the vibration created by the cycles of the compression and power strokes of the engine resonates with the vibration of the engine mount system, whereby the vibration is increased. As a result, the vibration in the lateral direction of the vehicle is generated.

To prevent these vibrations of the vehicle, the engine of the hybrid vehicle is going to stop, the torque from the motor generator MG1 is applied to the crankshaft 1090 of the engine 1000 via the power split mechanism PSD such that the engine speed is reduced in a predetermined speed reduction pattern 610 after a command to stop the engine is issued.

More specifically, immediately after the fuel-supply is cut off at time t0, a torque (positive torque) used to maintain the rotation of the crankshaft 1090 is generated by the motor generator MG1, whereby an abrupt reduction in the engine speed is prevented, and therefore occurrence of vibration of the vehicle in the region 602 is prevented. After that, the positive torque generated by the motor generator MG1 is gradually reduced, whereby the engine speed is reduced at a predetermined deceleration.

At time t1 that is before the vehicle resonance point (the engine speed that is achieved in the region 604) is reached, the output of a positive torque from the motor generator MG1 is stopped, and a torque (negative torque) is generated or the power generation operation is executed to stop the rotation of the crankshaft 1090. Thus, the duration during which the engine speed is within the engine speed region corresponding to the vehicle resonance point is reduced before the engine is stopped. Accordingly, occurrence of vibration of the vehicle as in the region 604 is suppressed.

The relationship in the rotational speed among the sun gear (the motor generator MG1), the planetary carrier (the output shaft of the engine) and the ring gear (the motor generator MG2) is set based on a predetermined gear ratio. Accordingly, the engine speed reduction control described above is executed by changing the command value used in the rotational speed control over the motor generator MG1 in the speed reduction pattern 610 in FIG. 14.

As described above, in the engine system provided with the variable valve timing system according to the embodiment of the invention, the intake valve phase needs to be reliably brought into the phase region 2500, in which the speed reduction ratio is high, by the time the engine 1000 is stopped such that the intake valve phase is within the phase region 2500 when the engine 1000 is stopped. However, the amount of change in the intake valve phase, which may be obtained from when a command to stop the engine is issued until when the engine is stopped, may be small. Accordingly, in the hybrid vehicle, the engine speed reduction control needs to be executed with the intake valve phase taken into account.

Figure 15:
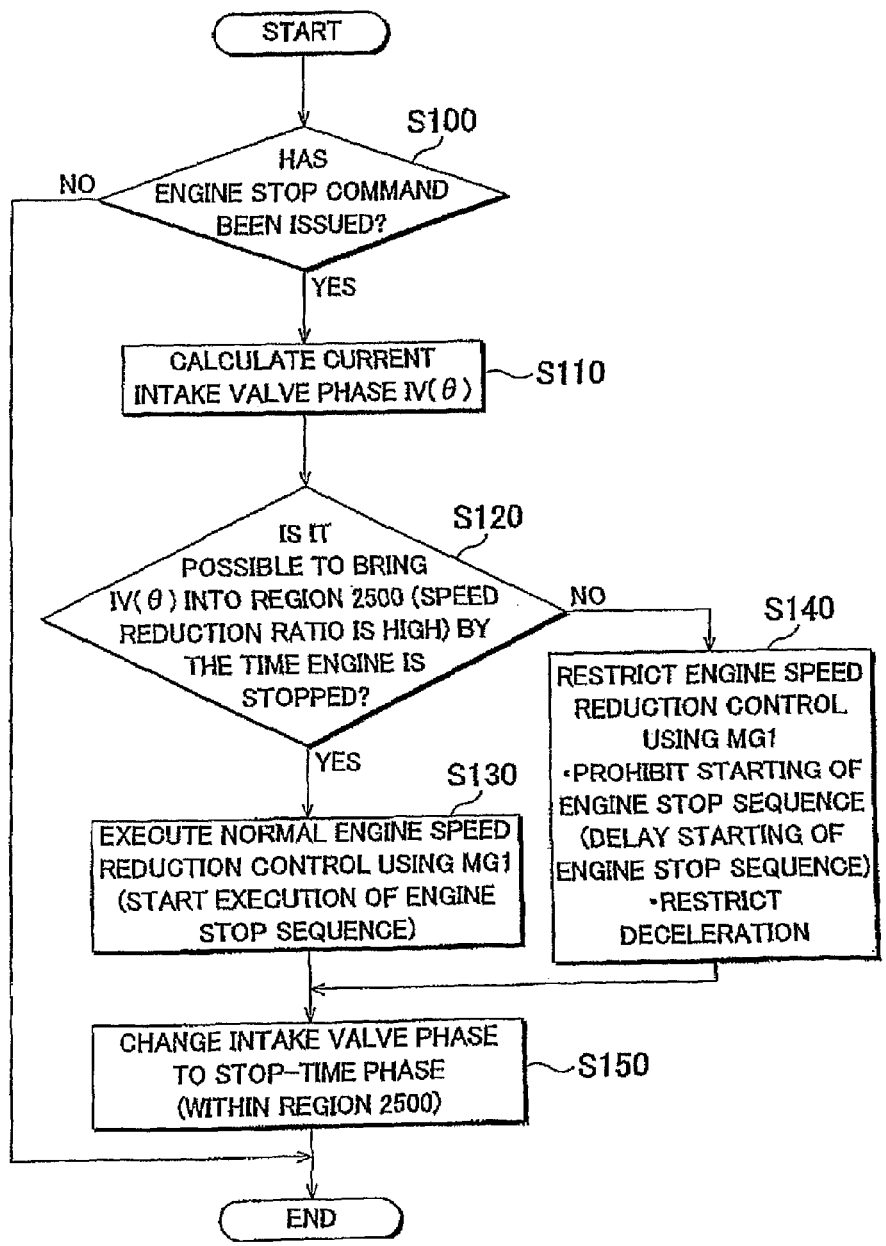
FIG. 15 is a flowchart illustrating the engine speed reduction control that is executed to stop the engine in the hybrid vehicle provided with the engine system according to the embodiment of the invention.

FIG. 15 is a flowchart illustrating the engine speed reduction control executed to stop the engine in the hybrid vehicle provided with the engine system according to the embodiment of the invention. The engine ECU 4000 executes a predetermined program in predetermined control cycles, whereby the control routine shown in the flowchart in FIG. 15 is executed.

As shown in FIG. 15, the engine ECU 4000 determines in step S100 whether a command to stop the engine (hereinafter, referred to as an "engine stop command") has been issued. The determination in step S100 is made based on the flag that is set to OFF when the engine is started and set to ON when an engine stop command is issued.

Examples of the engine stop command includes an engine stop command issued in response to the operation performed by the driver, typically, the operation to turn off an ignition switch, and an engine stop command that is automatically produced by the engine automatic stop control executed to perform the engine intermittent operation based on the operating state. For example, in the hybrid vehicle, the engine 1000 is automatically stopped in response to a command from the HV ECU 100 in the operation region in which the engine 1000 is operating with a low efficiency, for example, when the engine 1000 is operating at a low load.

When it is determined that an engine stop command has not been issued ("NO" in step S100), the control routine ends without executing the following steps.

After it is determined that an engine stop command has been issued ("YES" in step S100), the engine ECU 4000 calculates the current intake valve phase IV(θ) in step S110. For example, the engine ECU 4000 calculates the current intake valve phase IV(θ) based on a crank angle signal from the crank angle sensor 5000, a cam angle signal from the camshaft position sensor 5010, and a motor rotational angle signal from the rotational angle sensor 5050 of the electric motor 2060.

The engine ECU 4000 determines in step S120 whether the current state is the speed reduction enabled state. In the speed reduction enabled state, the intake valve phase can be brought into the phase region 2500, in which the speed reduction ratio is high, by the time the engine is stopped, if the normal engine speed reduction control in the predetermined speed reduction pattern 610 (FIG. 14) is started at the present moment. Thus, it is determined whether the engine speed reduction control needs to be restricted.

The determination in step S120 is made based on the phase difference Δθ between the current intake valve phase IV(θ) calculated in step S100 and the phase in the phase region 2500 (when the intake valve phase IV(θ) is within the phase region 2500, the phase difference Δθ is zero (Δθ=0)). For example, when the current phase difference Δθ is equal to or smaller than a predetermined value, an affirmative determination is made in step S120. On the other hand, when the current phase difference Δθ is larger than the predetermined value, a negative determination is made in step S120.

Figure 16:
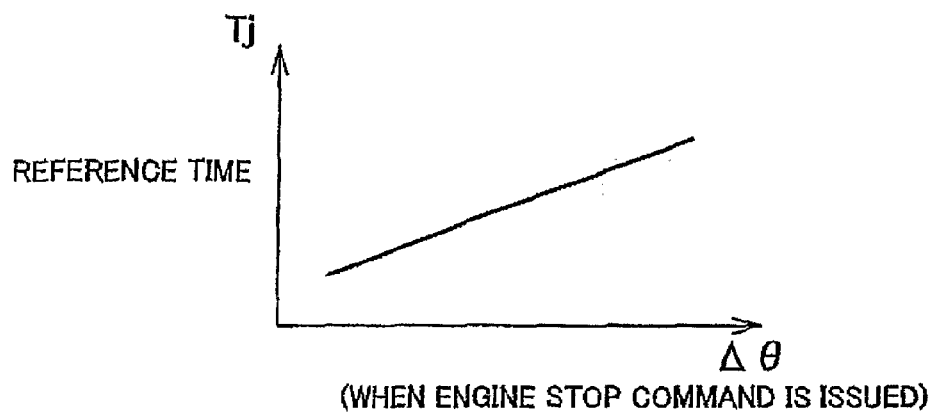
FIG. 16 is a graph illustrating the manner of setting the reference time used to determine whether the engine speed reduction control needs to be restricted.

Alternatively, the determination in step S120 may be made based on a result of comparison between the time, which has been elapsed since the engine stop command is issued and which is measured by a timer (not shown), and the reference time. More specifically, a negative determination is made in step S120 before the elapsed time reaches the reference time. After the elapsed time reaches the reference time, an affirmative determination is made in step S120. The reference time may be set to a fixed value. However, it is preferable to variably set the reference time based on the phase difference $\Delta\theta$ when an engine stop command is issued, as shown in FIG. 16. More specifically, it is preferable to set the reference time Tj to a larger value as the phase difference $\Delta\theta$ increases.

When an affirmative determination is made in step S120, namely, when the current state is the speed reduction enabled state, the engine ECU 4000 permits execution of the engine speed reduction control using the motor generator MG1 in the normal speed reduction pattern 610 (FIG. 14).

In response to permission from the engine ECU 4000, the HV ECU 100 changes the rotational speed of the motor generator MG1 such that the rotational speed of the crankshaft 1090 of the engine 1000 is reduced using the MG ECU 200.

In step S150, the engine ECU 4000 executes the intake valve phase control to change the intake valve phase IV($\theta$) to the stop-time phase set within the phase region 2500 in which the speed reduction ratio is high. Namely, the rotational speed command value Nmref for the electric motor 2060 that serves as the actuator is prepared based on the deviation of the current intake valve phase IV($\theta$) from the stop-time phase. After the intake valve phase IV($\theta$) matches the stop-time phase, the rotational speed command value Nmref is prepared such that the intake valve phase IV($\theta$) is maintained at the stop-time phase.

In the hybrid vehicle in which the engine is started frequently due to automatic execution of the engine intermittent operation, preferably, the start-time pressure reduction control for setting the start-time phase to the most delayed phase is executed to reduce the vibration when the engine is started. Accordingly, after an engine-stop command is issued, the target value used in the intake valve phase control executed by the VVT mechanism 2000 is set to the most delayed phase within the phase region 2500.

On the other hand, when a negative determination is made in step S120, namely, the current state is not the speed reduction enabled state, the engine ECU 4000 restricts, in step S140, the engine speed reduction control using the motor generator MG1.

The engine speed reduction control using the motor generator MG1 is restricted in step S140 by prohibiting starting of the engine stop sequence accompanied by the normal engine speed reduction control or by starting execution of the engine speed reduction control using a deceleration that is lower than that indicated by the normal speed reduction pattern 610 (FIG. 4).

Thus, the time from when an engine-stop command is issued until when the engine is stopped is made longer than that at the normal time, and the intake valve phase is changed in step S150 by a required amount. As a result, the intake valve phase is reliably brought into the phase region 2500, in which the speed reduction ratio is high, by the time the engine is stopped.

With this control configuration, in the hybrid vehicle in which the engine speed reduction control for reducing the engine speed in the predetermined speed reduction pattern to stop the engine is executed using the motor generator MG1 connected to the output shaft of the engine (the crankshaft 1090) via the gears of the planetary gear mechanism, the intake valve phase is reliably brought into the phase region 2500, in which the speed reduction ratio is high, by the time the engine is stopped such that the intake valve phase is within the phase region 2500 when the engine is stopped. Accordingly, the engine speed reduction control is executed without causing an undesirable change in the intake valve phase when the engine is stopped.

OTHER APPLICATION EXAMPLES

The engine system according to the embodiment of the invention may be applied to vehicles other than a hybrid vehicle. Namely, the engine system according to the embodiment of the invention may be applied to a vehicle in which the engine speed reduction control is executed to stop an engine, using an element that differs from the motor generator MG1 of the hybrid vehicle. The engine system that executes the engine speed reduction control is suitable for vehicles in which the engine intermittent operation is automatically performed. Accordingly, the engine system according to the embodiment of the invention is suitable for a vehicle provided with a so-called economy running system that automatically stops an engine when the engine starts idling.

Figure 17:
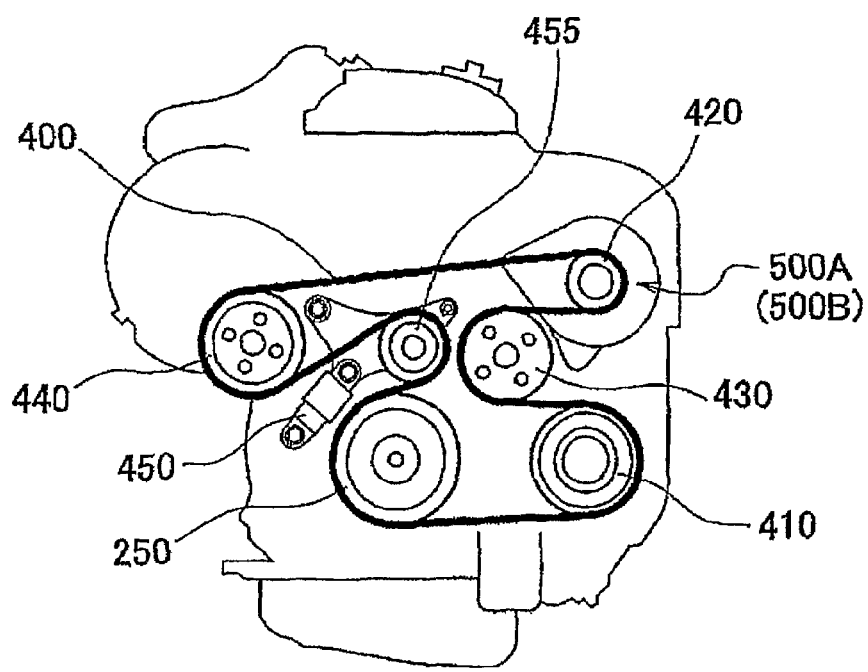
FIG. 17 is a view illustrating the arrangement of auxiliaries connected to the engine.

For example, as shown in FIG. 17, the engine speed reduction control may be executed using an alternator (an electric power generator) that is one of the auxiliaries of the engine 1000.

As shown in FIG. 17, a crankshaft pulley 250 of the engine 1000 is connected, by a belt 400, to an air-conditioner pulley 410, an electric power generator pulley 420, a coolant pump pulley 430, and a power steering pulley 440 that are used to drive the auxiliaries. In addition, an automatic tensioner 450 and an idler pulley 455 for the automatic tensioner are provided to maintain the tensile force of the belt 400.

An alternator 500A includes a rotor (not shown) that is rotated by the electric power generator pulley 420 and generates a rotating magnetic field, and a stator coil (not shown) that is configured to generate an electric current using the electromagnetic induction in response to generation of the rotating magnetic field generated by the rotor. As described above, the electric power generator pulley 420 is connected to the crankshaft pulley 250 via the belt 400, and is rotated by the power output from the engine 1000.

Accordingly, before the engine is stopped, generation of the magnetic field in the alternator 500A is controlled such that the rotational load of the rotor of the alternator 500A, namely, the deceleration, at which the rotational speed of the crankshaft 1090 is reduced, changes by a larger amount than when electric power is generated normally. In this way, the engine speed reduction control similar to that in FIG. 14 is executed.

Instead of the alternator 500A, a motor generator 500B may be employed which generates an engine starting torque when the engine is started, as in the case of the motor generator MG1, and which executes regenerative power generation using the turning force transferred via the belt 400 during the regenerative braking operation. With this configuration as well, the engine speed reduction control shown in FIG. 14 is executed.

With this configuration, the torque used to control the engine speed deceleration is applied to the crankshaft 1090 by controlling the torque output from the motor generator 500B. Namely, the engine speed reduction control is executed in the speed reduction pattern 610 shown in FIG. 14 by controlling the torque output from the motor generator 500B.

In also the case where the engine system, shown in FIG. 17, that executes the engine speed reduction control using the "rotary electric device", for example, the alternator 500A or the motor generator 500B that is connected to the output shaft of the engine (the crankshaft) via the belt, and the variable valve timing system according to the embodiment of the invention are used in combination, the intake valve phase is reliably brought into the phase region 2500, in which the speed reduction ratio is high, by the time the engine is stopped by executing the engine speed reduction control shown in FIG. 15 to stop the engine. In this way, the intake valve phase is reliably within the phase region 2500. Thus, the engine speed reduction control is executed without causing an undesirable change in the intake valve phase when the engine is stopped.

The mechanism that executes the engine speed reduction control, shown in FIG. 15, to stop the engine is not particularly limited. Namely, the engine speed reduction control is executable in an engine system that executes the engine speed reduction control using a mechanism that differs from the mechanism described in the embodiment.

In the embodiment of the invention described above, the engine speed reduction control executed to stop the engine using the motor generator MG1 (FIG. 12), the alternator 500A (FIG. 17), the motor generator 500B (FIG. 17), etc. may be regarded as an "engine speed reduction control unit" according to the invention. The process in step S120 in FIG. 15 may be regarded as a "determination unit" according to the invention. The process in step S140 may be regarded as a "speed reduction restriction unit" according to the invention.

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A method for controlling an engine system that includes an engine which produces drive power by burning fuel; and a variable valve timing system which includes an actuator and which changes opening/closing timing of at least one of an intake valve and an exhaust valve provided in the engine, comprising:

applying a torque, used to reduce an engine speed in a predetermined speed reduction pattern, to an output shaft of the engine, when a command to stop the engine is issued, changing the opening/closing timing by changing a rotational phase difference between a camshaft, which drives the valve of which the opening/closing timing is changed, and a crankshaft by a change amount corresponding to an operation amount of the actuator, when the engine is operating, setting a ratio of the change amount of the opening/closing timing with respect to the operation amount of the actuator to a lower value when the opening/closing timing is within a first phase region than when the opening/closing timing is within a second phase region, and determining whether a current state is a speed reduction enabled state in which it is possible to bring the opening/closing timing into the first phase region by the time the engine is stopped if reduction in the engine speed in the speed reduction pattern is started at a present moment that is after issuance of the command to stop the engine; and controlling an operation to reduce the engine speed after the command to stop the engine is issued, based on a result of a determination as to whether the current state is the speed reduction enabled state.

2. The method according to claim 1, wherein
a deceleration, at which the engine speed is reduced, is set to a first value according to the speed reduction pattern when it is determined that the current state is the speed reduction enabled state, while the deceleration, at which the engine speed is reduced, is set to a second value that is lower than the first value when it is determined that the current state is not the speed reduction enabled state.

3. The method according to claim 1, wherein
starting of the operation to reduce the engine speed is not permitted when it is determined that the current state is not the speed reduction enabled state, while starting of the operation to reduce the engine speed is permitted when it is determined that the current state is the speed reduction enabled state.

4. The method according to claim 1, wherein
whether the current state is the speed reduction enabled state is determined based on a phase difference by which the current opening/closing timing is apart from the first phase region.

5. The method according to claim 1, wherein
it is determined that the current state is not the speed reduction enabled state before a length of time that has elapsed since the command to stop the engine is issued reaches a reference time, while it is determined that the current state is the speed reduction enabled state after the length of time that has elapsed since the command to stop the engine is issued exceeds the reference time.

6. The method according to claim 5, wherein
the reference time is set based on a phase difference by which the opening/closing timing when the command to stop the engine is issued is apart from the first phase region.

7. The method according to claim 1, wherein
the command to stop the engine is issued in response to an operation performed by a driver.

8. The method according to claim 7, wherein
the operation of the driver is an operation to turn off an ignition switch.

9. The method according to claim 1, wherein
the command to stop the engine is automatically issued in response to an occurrence of a predetermined operating state, independently of the operation performed by the driver.

10. The method according to claim 9, wherein
the predetermined operating state is a state in which a hybrid vehicle is operating at a low load or a state in which an engine is idling in a vehicle provided with an economy running system.

* * * * *